(12) United States Patent
Wikström et al.

(10) Patent No.: US 12,309,638 B2
(45) Date of Patent: May 20, 2025

(54) METHOD FOR BUNDLING SAMPLING DATA FOR WIRELESS TRANSMISSION

(71) Applicant: Telefonaktiebolaget LM Ericsson (publ), Stockholm (SE)

(72) Inventors: Gustav Wikström, Täby (SE); Jonas Kronander, Knivsta (SE); Muhammad Ikram Ashraf, Espoo (FI); Fedor Chernogorov, Espoo (FI); Johan Torsner, Kyrkslätt (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 549 days.

(21) Appl. No.: 17/050,596

(22) PCT Filed: May 14, 2019

(86) PCT No.: PCT/SE2019/050429
§ 371 (c)(1),
(2) Date: Oct. 26, 2020

(87) PCT Pub. No.: WO2019/231376
PCT Pub. Date: Dec. 5, 2019

(65) Prior Publication Data
US 2021/0243649 A1    Aug. 5, 2021

Related U.S. Application Data

(60) Provisional application No. 62/679,232, filed on Jun. 1, 2018.

(51) Int. Cl.
*H04W 28/06*   (2009.01)
*H04W 4/70*    (2018.01)
*H04W 28/02*   (2009.01)

(52) U.S. Cl.
CPC ..... *H04W 28/065* (2013.01); *H04W 28/0268* (2013.01); *H04W 4/70* (2018.02)

(58) Field of Classification Search
CPC ............... H04W 28/0265; H04W 4/70; H04W 28/0268
See application file for complete search history.

(56) References Cited

U.S. PATENT DOCUMENTS 7,260,114 B1 *  8/2007  Rash ........................ H04L 43/00
                                                            370/473
8,929,290 B2 *  1/2015  Lindner .................. H04L 65/80
                                                            370/522
(Continued)

FOREIGN PATENT DOCUMENTS

EP        2333673 A1    6/2011
WO    2005050902 A1    6/2005

OTHER PUBLICATIONS

"3GPP TR 38.913 V14.3.0", 3rd Generation Partnership Project; Technical Specification Group Radio Access Network; Study on Scenarios and Requirements for Next Generation Access Technologies; (Release 14), Jun. 2017, pp. 1-39.
(Continued)

*Primary Examiner* — Parth Patel
(74) *Attorney, Agent, or Firm* — Murphy, Bilak & Homiller, PLLC

(57) ABSTRACT

Embodiments described herein provide methods and apparatus for transmitting at least one data stream comprising a plurality of samples between a first wireless device and a second wireless device using machine-to-machine communication. A method in the first wireless device comprises receiving the at least one data stream; generating a first data packet comprising N of the plurality of samples, wherein N
(Continued)

T     Total length of time window
S     Sample
SPTD  Sample Packing Transmitting Device
SURD  Sample Unpacking Receiving Device is an integer value of greater than or equal to 2; and transmitting the first data packet to the second wireless device.

16 Claims, 13 Drawing Sheets

(56) References Cited

U.S. PATENT DOCUMENTS

| | | | | |
|---|---|---|---|---|
| 9,349,287 | B1* | 5/2016 | Holzwanger | G08G 1/096716 |
| 2003/0195011 | A1* | 10/2003 | Mayer | H04W 28/065 |
| | | | | 455/560 |
| 2004/0190663 | A1* | 9/2004 | Carsello | H04L 7/042 |
| | | | | 375/334 |
| 2005/0259690 | A1* | 11/2005 | Garudadri | H04N 19/164 |
| | | | | 370/477 |
| 2007/0147258 | A1* | 6/2007 | Mottishaw | H04L 43/12 |
| | | | | 370/392 |
| 2010/0202368 | A1* | 8/2010 | Hans | H04L 65/1069 |
| | | | | 370/352 |
| 2012/0314599 | A1* | 12/2012 | Vilke | H04L 47/196 |
| | | | | 370/252 |
| 2013/0223336 | A1* | 8/2013 | Lindner | H04L 47/35 |
| | | | | 370/328 |
| 2013/0301496 | A1* | 11/2013 | Nagaraj | H04W 52/0216 |
| | | | | 370/311 |
| 2014/0359153 | A1* | 12/2014 | Heng | H04L 65/65 |
| | | | | 709/231 |
| 2015/0003473 | A1* | 1/2015 | Park | H04L 1/0006 |
| | | | | 370/476 |
| 2015/0173615 | A1* | 6/2015 | Nagasaki | A61B 5/6898 |
| | | | | 600/301 |
| 2016/0119738 | A1* | 4/2016 | Hampel | H04W 72/0446 |
| | | | | 370/329 |
| 2016/0218883 | A1* | 7/2016 | Lee | H04L 67/06 |
| 2016/0364925 | A1* | 12/2016 | Kakino | G06K 7/10861 |
| 2017/0099327 | A1* | 4/2017 | Negalaguli | H04L 67/42 |
| 2017/0220277 | A1* | 8/2017 | Nakayama | G06F 16/1794 |
| 2017/0230141 | A1* | 8/2017 | Jeong | H04L 1/0057 |
| 2017/0311308 | A1* | 10/2017 | Park | H04L 41/0893 |
| 2017/0371769 | A1* | 12/2017 | Merten | G06F 9/45558 |
| 2018/0220426 | A1* | 8/2018 | Rico Alvarino | H04W 72/0466 |
| 2018/0270148 | A1* | 9/2018 | Ni | H04L 45/44 |
| 2018/0310327 | A1* | 10/2018 | Aarnio | G16H 40/67 |
| 2018/0317188 | A1* | 11/2018 | Stager | H04W 56/0015 |
| 2018/0376383 | A1* | 12/2018 | Belghoul | H04W 36/06 |
| 2019/0082385 | A1* | 3/2019 | Shellhammer | H04W 52/0235 |
| 2019/0103951 | A1* | 4/2019 | Park | H04L 1/1861 |
| 2019/0104106 | A1* | 4/2019 | Kumar | H04L 47/60 |
| 2019/0104437 | A1* | 4/2019 | Bartfai-Walcott | |
| | | | | H04W 28/0231 |
| 2019/0182703 | A1* | 6/2019 | Huang | H04W 24/10 |
| 2019/0215812 | A1* | 7/2019 | Lyu | H04L 27/26025 |
| 2019/0313474 | A1* | 10/2019 | Kantharaju | H04L 65/607 |
| 2019/0356898 | A1* | 11/2019 | Choi | H04N 13/194 |
| 2020/0163046 | A1* | 5/2020 | Chen | H04W 74/0833 |
| 2020/0280873 | A1* | 9/2020 | Yan | H04W 28/10 |
| 2020/0314905 | A1* | 10/2020 | Morioka | H04W 74/0816 |
| 2021/0013937 | A1* | 1/2021 | Huang | H04B 7/0456 |
| 2021/0127343 | A1* | 4/2021 | Mladin | H04W 76/14 |
| 2021/0144588 | A1* | 5/2021 | Tang | H04W 28/0268 |
| 2021/0243649 | A1* | 8/2021 | Wikström | H04W 28/065 |

OTHER PUBLICATIONS

ABB Review, "Special Report IEC 61850", ABB Review Special Report, The corporate technical journal, ABB Review, Aug. 2010, pp. 1-64.

Li, Ming, et al., "Loss Aware Sample Packetization Strategy for Improvement of Body Sensor Data Analysis", 2015 International Conference on Computing, Networking and Communications, Invited Position Papers, IEEE, 2015, pp. 673-678.

Berger, Michael, "Multipath packet switch using packet bundling", High Performance Switching and Routing, Mergin Optical and IP Technologies Workshop, May 26-29, 2002, pp. 244-248.

Choi, Baek-Young, et al., "QoS and Channel-Aware Packet Bundling for Capacity Improvement in Cellular Networks", IEEE Transactions on Vehicular Technology, vol. 59, No. 8, Oct. 2010, pp. 3886-3901.

Garau, Michele, et al., "A 5G Cellular Technology for Distributed Monitoring and Control in Smart Grid", 2017 IEEE International Symposium on Broadband Multimedia Systems and Broadcasting (BMSB), Jun. 7, 2017, pp. 1-6.

* cited by examiner

METHOD FOR BUNDLING SAMPLING DATA FOR WIRELESS TRANSMISSION

TECHNICAL FIELD

Embodiments described herein relate to methods and apparatus for transmitting at least one data stream comprising a plurality of samples between a first wireless device and a second wireless device using machine-to-machine communication.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Machine-to-machine (M2M) communication may make up a large part of some new types of services and use cases that 5G systems will address. M2M is envisioned to enable control and automation of dynamic processes in various fields, for example, industrial process automation and manufacturing, energy distribution, and intelligent transport systems (ITS). Ultra-reliable low-latency communications (URLLC) is one important enabler supporting these new services.

An example of stringent requirements on URLLC currently being studied in 3GPP RAN WG is 99.999% reliability under the radio latency bound of 1 millisecond. Specifically, electrical grids substation automation (SA) is commonly used to control, protect and monitor substations. Latency and reliability may be considered as key components of an SA communication system for uninterrupted power supply from the power transmission. In SA, many sampling values are collected from a device (for example, a transformer) in timely manner and sent over a wired network. For example, in a reliable SA scenario, sampled values may be transmitted with a high rate corresponding to the sampling rate of the current and voltage through the device, for example 80 messages per cycle being 4000 messages/see for a 50 Hz system.

Currently, URLLC use conventional wired solutions which rely on a physical deployment of the wired connections. These are less convenient than wireless solutions as they have a rigid deployment, which can be costly and thus may not be considered appropriate for smart electrical systems, for example, for substation automation. This motivates the need for flexible, scalable, and cost effective wireless solutions.

In smart SA in particular, devices may send monitoring or reporting data (sample values) in an uplink-dominant state fashion using short session times and short packets. However, the transmission of high rate sampling values in such a high rate of data packets is disallowed using LTE as it elevates overhead and resource waste.

Transmission of high rate sampling values may be used in precise and synchronous time-critical monitoring systems, for example as previously mentioned, in factory automation and smart electrical grid environments. In the majority of these applications, sampling data transmissions are performed via a wired connection, for example using an Ethernet-based serial link. These wired solutions have inherent advantages, for example, the capability to meet tight quality of service (QOS) requirements in terms of delay and reliability. These quality of service requirements may not be so easily achievable using wireless solutions. However, one disadvantage of a wired infrastructure is that the deployment and any future modifications, for example, the addition of new sampling device, would be costly and complicated to implement.

QoS constraints applied to high-rate sampled data used, for example, for monitoring the operation of a digital substation are mainly described in terms of latency and reliability. For example, the domain communication delay for sampled values may be constrained within a 3 ms margin, in order to react in a timely manner on the changing conditions or failures. An additional QoS metric for sampled values may be reliability. The reliability may be considered to be a measure of how well the equipment or system performs its intended function, under specified conditions, for a specified period of time. In time-critical functions, reliability may also be measured in terms of a maximum allowed response time for an action. Thus, for sampling data transmissions, reliability may be based on a percentage of lost packets and packets outside of the delay margin. Even though the amount of lost packets requirement may be a relatively low barrier, for example a less than 50% success rate in which no consecutive packets are lost, the extremely short delay boundary may still make the QoS requirements difficult to fulfill.

$5^{th}$ generation (5G) radio access technologies, if compared to previous generations of wireless communication networks, are capable of implementing more flexible resource allocation and transmission granularity both in time and frequency domains. On top of that, various repetition and traffic prioritization schemes guarantee low-latency and high reliability of data transfer.

There currently exist certain challenge(s). For example, a high sampling rate leads to a high rate of wireless data packets, which may be challenging given high QoS constraints. Wire-based services have a predefined format that in some circumstances it may be required to follow.

Certain aspects of the present disclosure and their embodiments may provide solutions to these or other challenges.

SUMMARY

According to embodiments described herein there is provided a method performed by a first wireless device for transmitting at least one data stream comprising a plurality of samples to a second wireless device using machine-to-machine communication. The method comprises receiving the at least one data stream; generating a first data packet comprising N of the plurality of samples, wherein N is an integer value of greater than or equal to 2; and transmitting the first data packet to the second wireless device.

According to some embodiments there is provided a method performed by a second wireless device for receiving at least one data stream comprising a plurality of samples from a first wireless device using machine-to-machine communication. The method comprises receiving at least a first data packet; extracting N samples from the first data packet, wherein N is an integer value of greater than or equal to 2; and generating the at least one data stream based on the extracted N samples.

According to some embodiments there is provided a first wireless device for transmitting at least one data stream comprising a plurality of samples to a second wireless device using machine-to-machine communication. The first wireless device comprises processing circuitry configured to: receive the at least one data stream; generate a first data packet comprising N of the plurality of samples, wherein N is an integer value of greater than or equal to 2; and transmit the first data packet to the second wireless device.

According to some embodiments there is provided a second wireless device for receiving at least one data stream comprising a plurality of samples from a first wireless device using machine-to-machine communication. The second wireless device comprises processing circuitry configured to: receive at least a first data packet; extracting N samples from the first data packet, wherein N is an integer value of greater than or equal to 2; and generating the at least one data stream based on the extracted N samples.

DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

There are, proposed herein, various embodiments which address one or more of the issues disclosed herein.

Certain embodiments may provide one or more of the following technical advantage(s). For example, embodiments provided herein a wireless connection which can efficiently be used to provide high-rate sampling services within QoS constraints.

A first wireless device, which may for example be referred to as a sample packing transmitting device (SPTD), may be configured to bundle multiple samples of a data stream into less packets than the number of samples, thereby enabling a consistent compound flow which makes it possible to keep the connection with the second wireless device, which may for example be referred to as a sample un-packing receiving device (SURD) (e.g., base station or a wireless device), alive, thus reducing the signalling due to multiple sessions being initiated and ended.

Furthermore, by bundling a plurality of samples into a larger packet, the first wireless device may use a single access request to the second wireless device, thus proportionally reducing the transmission overhead.

Furthermore, by having fewer packets being transmitted over the wireless channel between the first wireless device and the second wireless device, the overall network latency and resource usage is reduced.

Furthermore, the first wireless device may act as proxy device and therefore reduce total number of requests.

Furthermore, by having bundling and unbundling processes comprised within existing network devices leads to a reduction in high-cost cellular communication modems.

Figure 1:
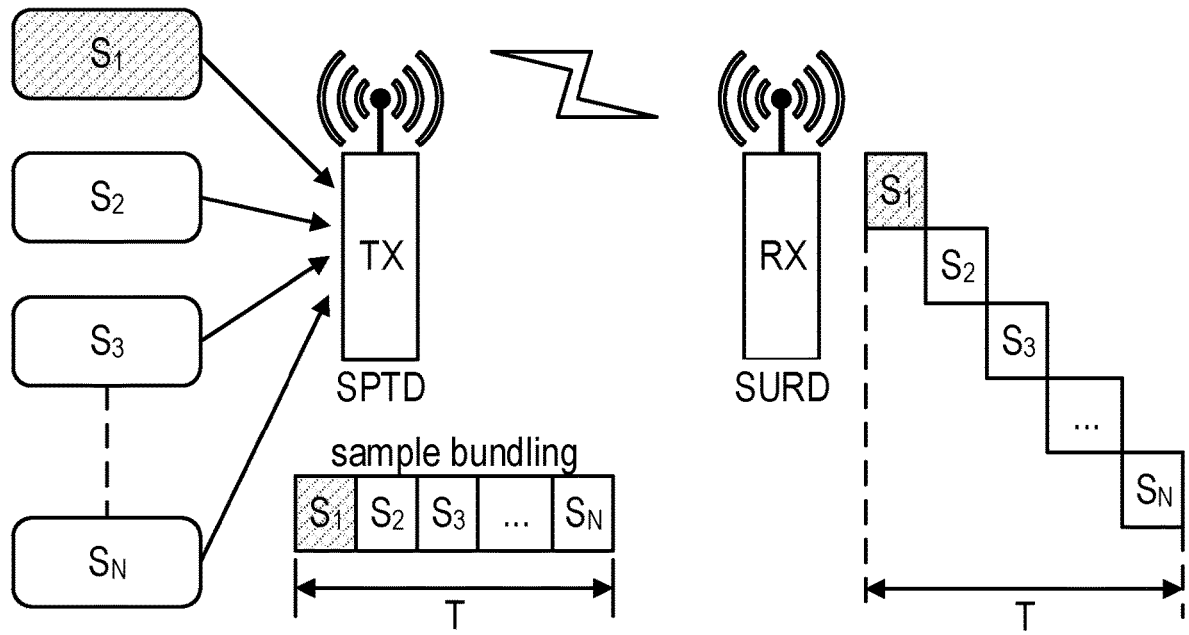
FIG. 1 illustrates a wireless M2M communication link between a first wireless device and a second wireless device.

FIG. 1 illustrates a wireless M2M communication link between a first wireless device (SPTD) and a second wireless device (SURD).

As illustrated in FIG. 1, in embodiments described herein, a number (N) of samples are bundled by the first wireless device (SPTD), into a packet that can be tailored to timings with the radio interface and the requirements of the second wireless 25 device (SURD).

Firstly, the samples ($S_1$ to $S_N$) are collected by the first wireless device. The samples may then be buffered until N (the value of which can be a fixed or dynamically chosen number) samples are stored, and then some or all of these samples may be bundled together into a packet.

In FIG. 1 the samples $S_1$ to $S_N$ are bundled into a packet and transmitted to the second wireless device.

The packet may then be transmitted over the wireless channel to the second wireless device. The second wireless device may then unbundle, unpack or extract the samples from the packet. These samples may be buffered whilst the extraction is taking place. The samples may then be reordered into the same order as they were received by the first wireless device, and with the same time difference between all samples as originally received by the first wireless device.

Figure 2:
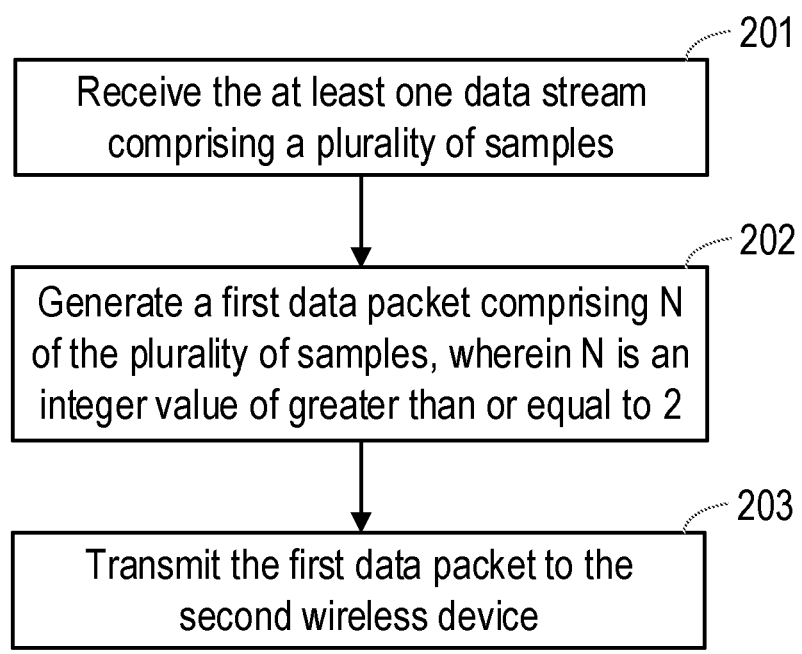
FIG. 2 illustrates a method in a first wireless device for at least one data stream comprising a plurality of samples to a second wireless device using M2M communication.

FIG. 2 illustrates a method in a first wireless device for transmitting at least one data stream comprising a plurality of samples to a second wireless device using machine-to-machine communication.

The first wireless device may be referred to as a transmitting wireless device or a bundling wireless device. The first wireless device may aim to improve the system utilization by exploiting the existing device (e.g., reading sample values from sensor board) capabilities. Therefore, the first wireless device may be configured to package streams of samples over time and act as sample aggregator. At the time of receiving a scheduling request (SR) for transmission, the first wireless device may bundle a number of N of samples in its transmission buffer to a single packet.

For example, in step 201 the first wireless device receives the at least one data stream. It will be appreciated that in some examples there may be more than one data stream, and that the first wireless device may aggregate the data streams for transmission to the second wireless device.

In step 202, the first wireless device generates a first data packet comprising N of the plurality of samples, wherein N is an integer value of greater than or equal to 2. In particular, the step of generating may comprise bundling the N samples into the first data packet according to a predetermined pattern.

In step 203, the first wireless device transmits the first data packet to the second wireless device.

Figure 3:
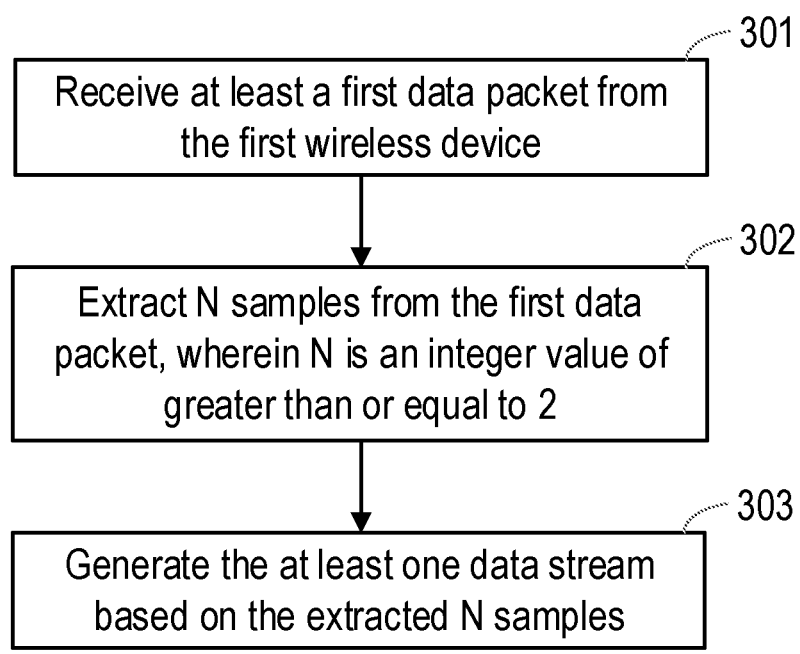
FIG. 3 illustrates a method performed by a second wireless device for receiving at least one data stream comprising a plurality of samples from a first device using communication.

FIG. 3 illustrates a method performed by a second wireless device for receiving at least one data stream comprising a plurality of samples from a first wireless device using machine-to-machine communication.

To maintain the requirements (for example, latency requirements) of the wireless channel, the second wireless device, for example the second wireless device illustrated in FIG. 1, may be configured such that it expects packets comprising multiple small size samples. The second wireless device may be configured to unpack the samples in according to the same predetermined pattern used by the first wireless device to package the samples before transmission. The main role of second wireless device is to unpack those samples such that a processing device receiving the unpacked at least one data stream, receives the at least one data stream in the same way in which they were received at the first wireless device.

For example, the second wireless device configured to perform the method illustrated in FIG. 3, may be the second wireless device in FIG. 1 and may be communicating to receive data streams from the first wireless device illustrated in FIG. 1 (which may be configured to perform the method as illustrated in FIG. 2).

In step 301, the second wireless device receives at least a first data packet from the first wireless device.

In step 302, the second wireless device extracts N samples from the first data packet, wherein N is an integer value of greater than or equal to 2.

In step 303, the second wireless device then generates the at least one data stream based on the extracted N samples. In particular, the second wireless device may de-bundle (or unpack) the N samples into the at least one first data stream according to a predetermined pattern.

In other words, the first wireless device on the transmitting side collects sampling data packets from a sampling device in a time window and bundles them for transmission over a wireless channel to the second wireless device. The second wireless device on the receiving side then unbundles the samples out of the data packets, according to the same predetermined pattern used by the first wireless device to bundle the samples, and sends them on to an evaluation device in an expected time pattern. It will be appreciated that the predetermined pattern used to bundle one packet may be different to a predetermined pattern used to bundle a different packet, even in the same data stream. For example, some packets may comprise one sample, whereas other packets may comprise more than one sample.

Figure 4:
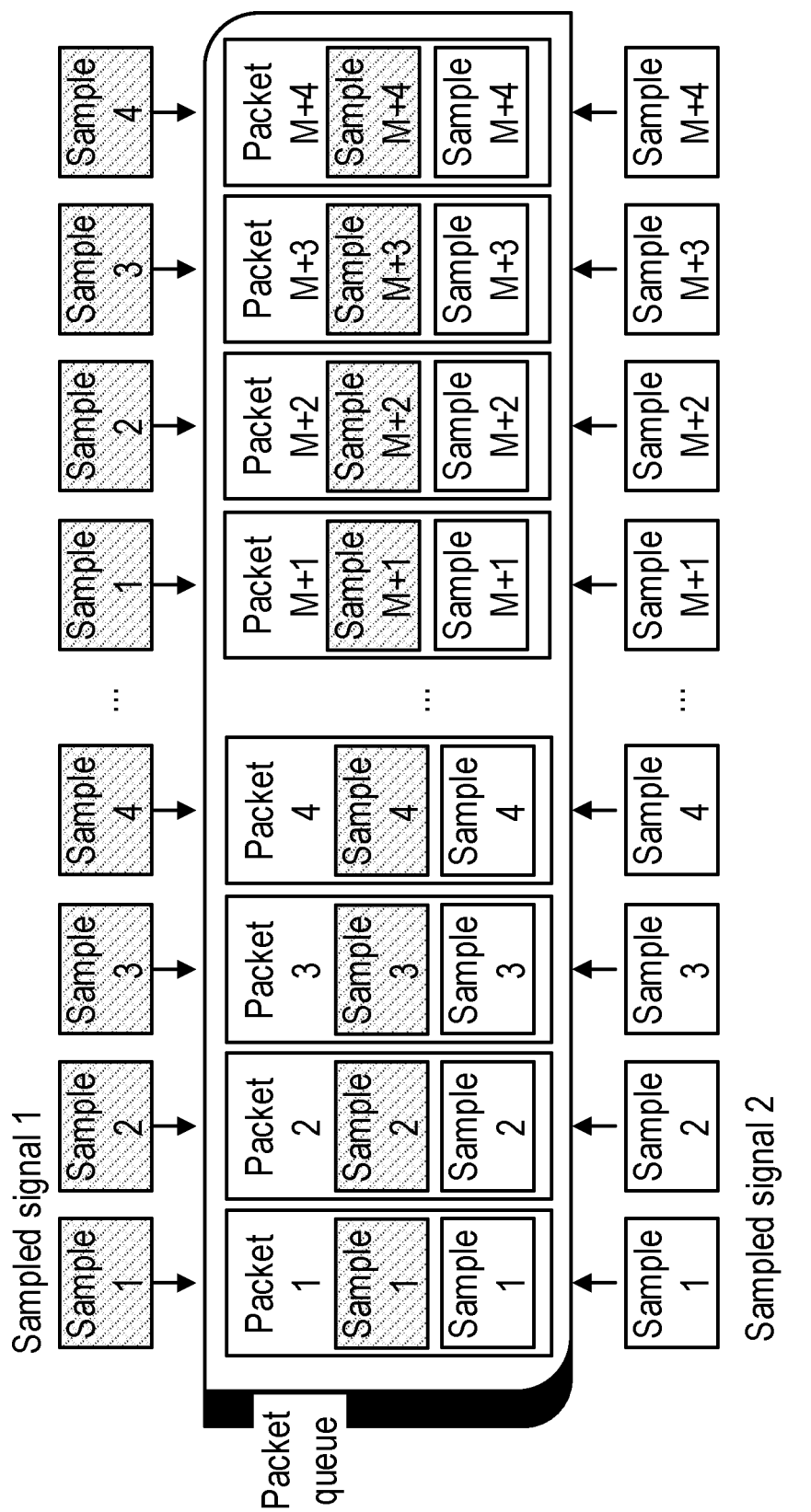
FIG. 4 illustrates an example of two data streams for which the samples are bundled with only one sample from each stream in each packet.

FIG. 4 illustrates an example of two data streams, sampled signal 1 and sampled signal 2, for which the samples are bundled with only one sample from each stream in each packet. In this example, therefore, the number of packets is equal to the number of samples in a single stream.

One sample is taken from each data stream, and both of these samples are bundled into a packet. For example, the first sample from each data stream is bundled into Packet 1, the second sample from each data stream is bundled into packet 2, and so on and so forth until the M+4 sample from each data stream is bundled into packet M+4.

Figure 5:
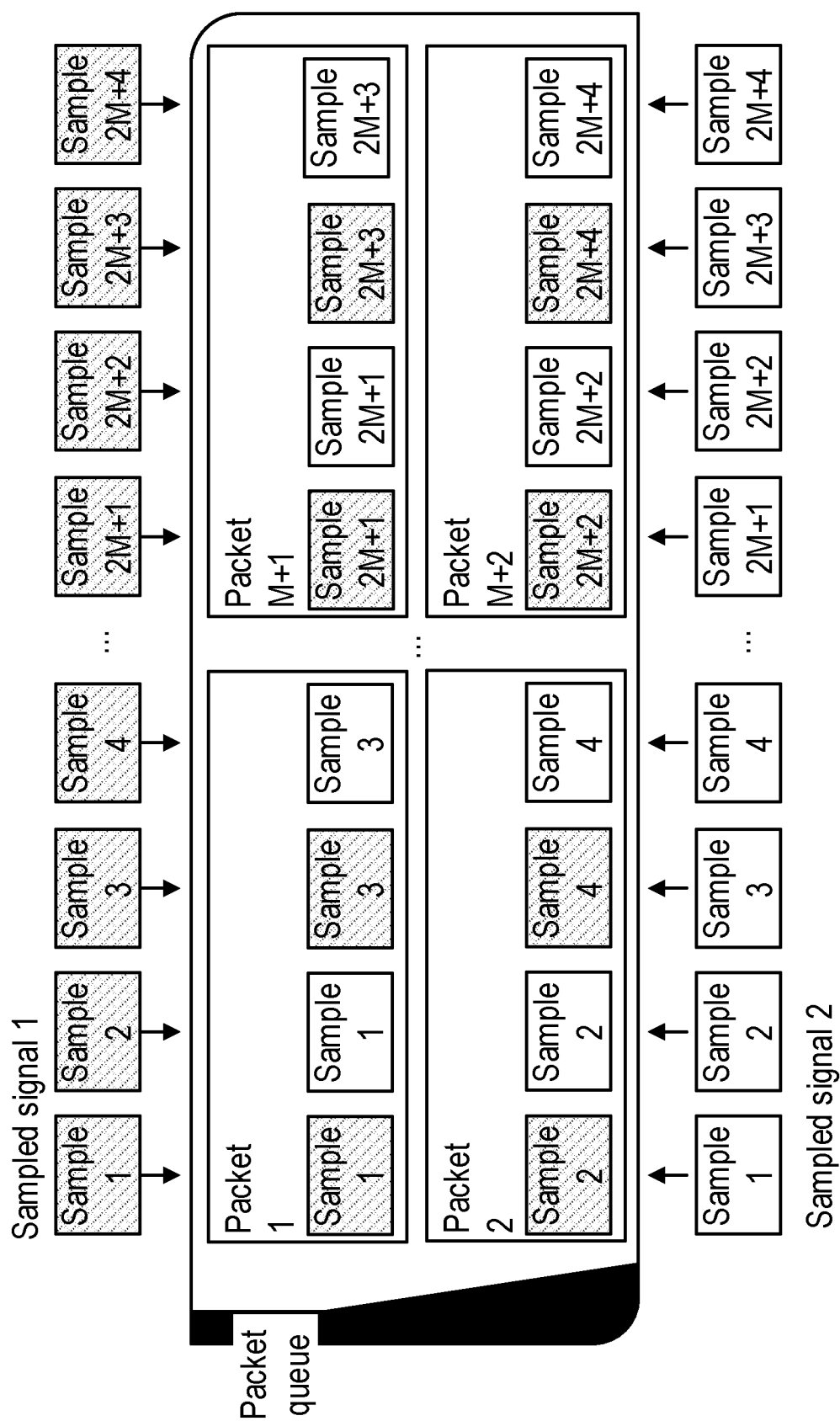
FIG. 5 illustrates an example where two data streams are bundled with two samples from each stream in each packet.

FIG. 5 illustrates an example where two data streams, sampled signal 1 and sampled signal 2, are bundled with two samples from each stream in each packet. FIG. 5 therefore demonstrates that by bundling N samples into one packet, the total number of packets is reduced by N. In this case N=2.

It is typical in industrial applications that the receiving wireless device, i.e. the second wireless device, may tolerate occasional lost packets or samples, but if more than a certain number of samples are lost in a row (for example 2 or 3 samples in a row) the second wireless device may interpret this to mean that the wireless channel is an unreliable communication link and the second wireless device may then perform an emergency action, for example, an automatic emergency stop or similar. If the second wireless device has this characteristic, the bundling method may become sensitive to transmission errors on the wireless channel. If, for example, 3 samples are bundled together in each packet, a single lost packet over the wireless channel, would result in 3 consecutive lost samples, which may then trigger an emergency action even if the overall loss rate of over the wireless channel is acceptable.

In the example illustrated in FIG. 5, therefore, in order to meet the reliability requirement and avoid loss of several consecutive samples, each packet bundles only odd or even samples. The predetermined pattern of bundling the samples in this example, therefore, comprises bundling two odd samples and two even samples together.

If, for another example, the timing requirements allow for four samples to be bundled together, a single data stream may be bundled as follows:

Packet 1: S1, S3, S5, S7
Packet 2: S2, S4, S6, S8
Packet 3: S9, S11, S13, S15
Packet 4: S10, S12, S14, S16

It will be appreciated avoiding loss of two consecutive samples if a packet is lost may be achieved in general by an example predetermined pattern which comprises bundling samples identified by a sampling ID (sID) of sID=k+ stepover*m wherein stepover is an integer value of greater than or equal to 2, k is an sID of a first sample to be bundled into the data packet, and m=0:N−1. In this example, the first wireless device may be configured to buffer k+stepover*m samples in order to generate the packets appropriately.

In some examples, the predetermined pattern used to bundle and/or unbundle the samples from the packets is fixed, for example, on set up of the first wireless device and the second wireless device. However, in some embodiments the predetermined pattern may be determined dynamically, for example based on quality of service requirements associated with a particular transmission. For example, the first wireless device may be configured to transmit an indication of the predetermined pattern which it has used to bundle the samples to the second wireless device. This then allows the second wireless device to reverse the predetermined pattern used by the first wireless device when unbundling the samples at the receiving end.

For example, the first wireless device may be configured to transmit an indication of the value of k and/or N used in bundling the samples to the second wireless device. In some examples, the size of N may be as high as the delay requirement for sampled values allows, as will be described later.

The predetermined pattern used to bundle packets may be adapted based on QoS requirements and the error rate of the wireless channel between the first wireless device and the second wireless device.

Figure 6:
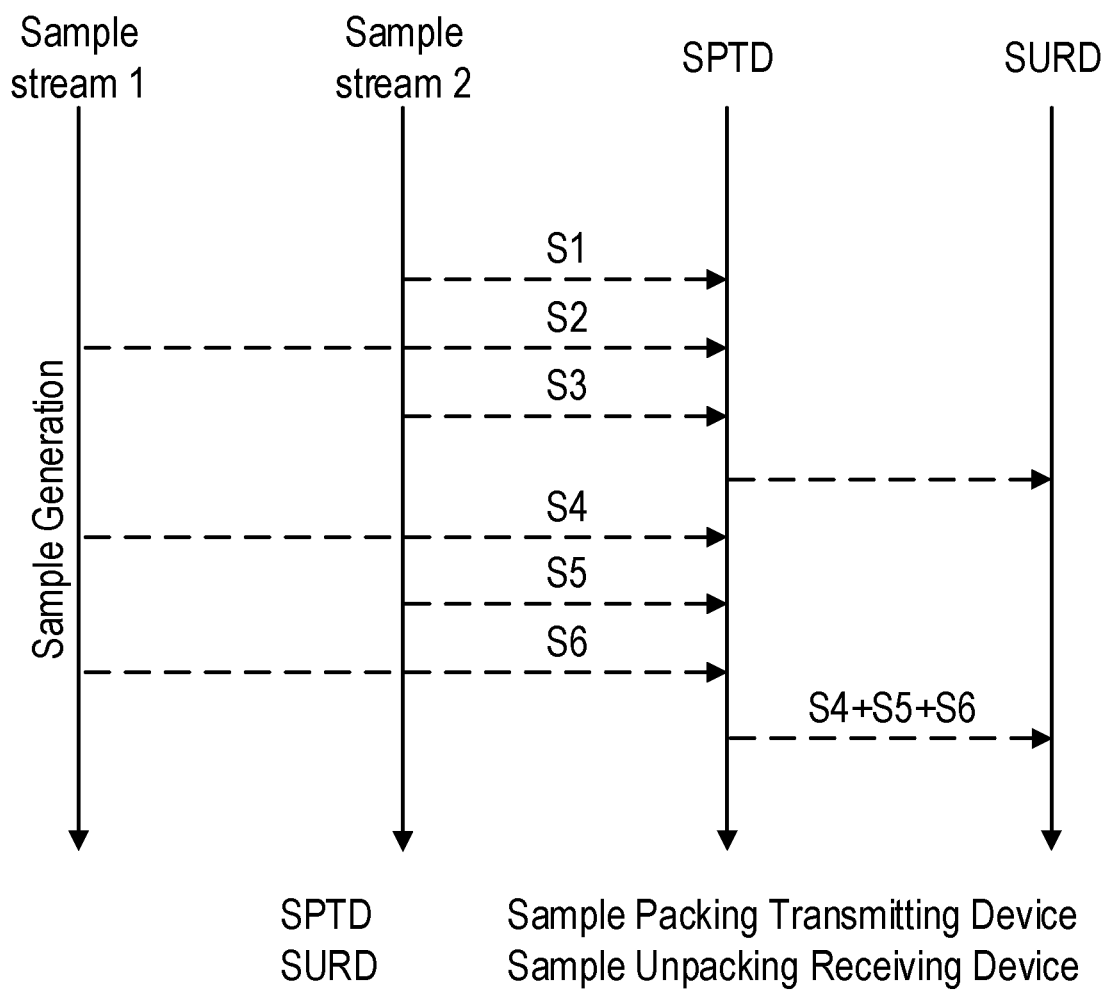
FIG. 6 illustrates an example flow diagram for bundling two sampling streams for transmission from a first wireless device to a second wireless device.

FIG. 6 illustrates an example flow diagram for bundling two sampling streams, sample stream 1 and sample stream 2 for transmission from a first wireless device, the SPTD, to a second wireless device, the SURD.

In this example, the SPTD receive samples S1, S3 and S5 from sampling stream 2 and samples S2, S4 and S6 from sample stream 1. The SPTD then bundles these samples into two packets. The first packet comprises the samples S1, S2 and S3, and the second sample comprises the samples S4, S5 and S6. These two packets are then transmitted to the SURD for unbundling. In this example therefore the predetermined pattern of bundling comprises bundling a single sample from the first data stream with two samples from the second data stream into the first packet, and then bundling two samples from a first data stream with a sample from a second data stream into the second packet.

In some examples, a high rate of samples may be received by the first wireless device, but not at a very high data rate. For example, an application may generate small packets every 0.25 ms or 0.5 ms. If these packets are transmitted over LTE with a transmission time interval (TTI) of 1 ms a bundling of 4 or 2 packets, respectively, to be sent together in each packet to send one packet per TTI. However, to increase the robustness, when the data rate is low, each packet may be duplicated in at least one subsequent TTI. In this way, if the transmission in one TTI is lost due to interference, the data in the TTI may still be available in the at least one other TTI.

In other words, the first wireless device may be configured to transmit the first data packet in a first transmission time interval; and transmit a repeat of the first data packet in a second transmission time interval after the first transmission time interval.

In some examples, the value of N depends on the application (e.g., factory automation, robotic control application etc.) latency and reliability requirements of a particular data stream. If applications are tied to lower latency values, the time period for bundling a packet may be required to remain low.

It will be appreciated that the larger the value of N, (and the larger the value of k), the higher the delay incurred in bundling the packets, as more samples must be buffered before the packets can be generated.

Since the samples are delivered to their end destination, by the second wireless device, in the same order as they were received at the first wireless device, each sample may need to wait an additional time in the buffer at the first wireless device apparatus for the packet to be formed and a time in the buffer at the second wireless device in order to be placed back into the data stream with the correct timing. This extra delay may be the same for all samples (otherwise they would end up in the wrong order) and this delay may be calculated as:

$$d_{bundling} = \frac{1}{r} * N$$

where N is the number of samples in a packet, r is the sampling rate (i.e., the number of samples that arrive per second at the first wireless device).

Figure 7:
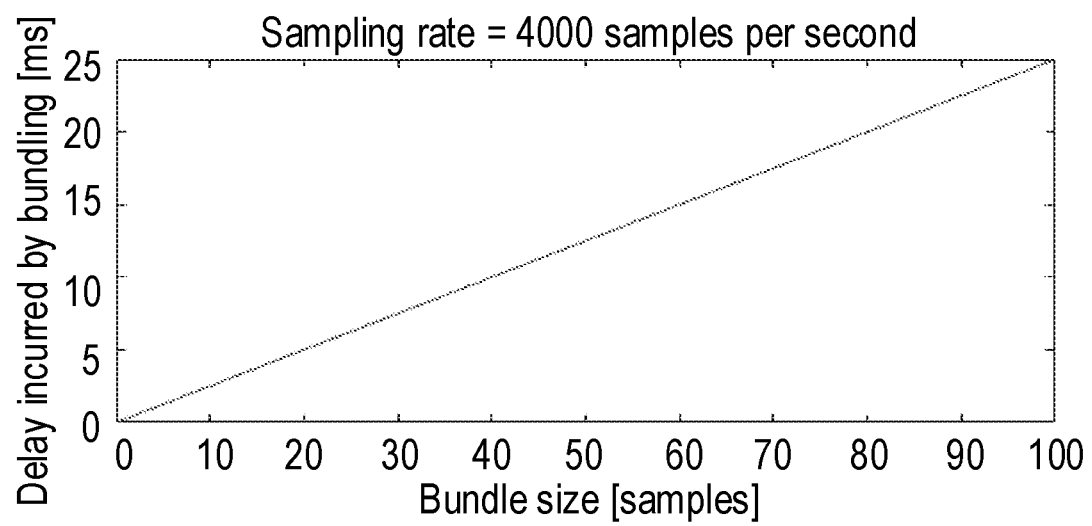
FIG. 7 illustrates an example where each sample is of same size.

FIG. 7 illustrates an example where each sample is of same size (for example, the same number of bits). In particular, FIG. 6 illustrates the delay due to the bundling as a function of the number of samples in a packet for the case where 4000 samples per second is received at the first wireless device.

In some embodiments therefore the value of N may satisfy the following:

$$N \leq \left\lfloor \frac{bits\_per\_packet}{bits\_per\_sample} \right\rfloor,$$

where bits_per_packet is a number of bits per transmission time interval and bits_per_sample is a number of bits in each of the plurality of samples. Note the floor function, rounding the fraction to the below integer value.

This means that the value of N used may be based on the number of bits that fits into a packet that is optimized for transmission by the radio technology used to generate the wireless channel.

In one embodiment this is done by first considering the number of bits needed to describe each sample (bits_per_sample) and the number of bits (bits_per_packet) that can be transported in a packet that is possible to transmit in a TTI (transmission time interval) using the radio access technology. The latter depends on the available bandwidth.

In some embodiments the value of N may additionally or alternatively satisfy the following: $N \leq r * d_{bundling}$, wherein r is a sampling rate of the at least one data stream and $d_{bundling}$ is a maximum delay allowed for bundling of the at least one data stream. In other words, if $$\left\lfloor \frac{bits\_per\_packet}{bits\_per\_sample} \right\rfloor \leq r * d_{bundling}$$

then $$\left\lfloor \frac{bits\_per\_packet}{bits\_per\_sample} \right\rfloor$$

may be used as the value of N. However, if $$\left\lfloor \frac{bits\_per\_packet}{bits\_per\_sample} \right\rfloor > r * d_{bundling}$$

then a value of N which satisfies $N \leq r * d_{bundling}$ may be used.

Figure 8:
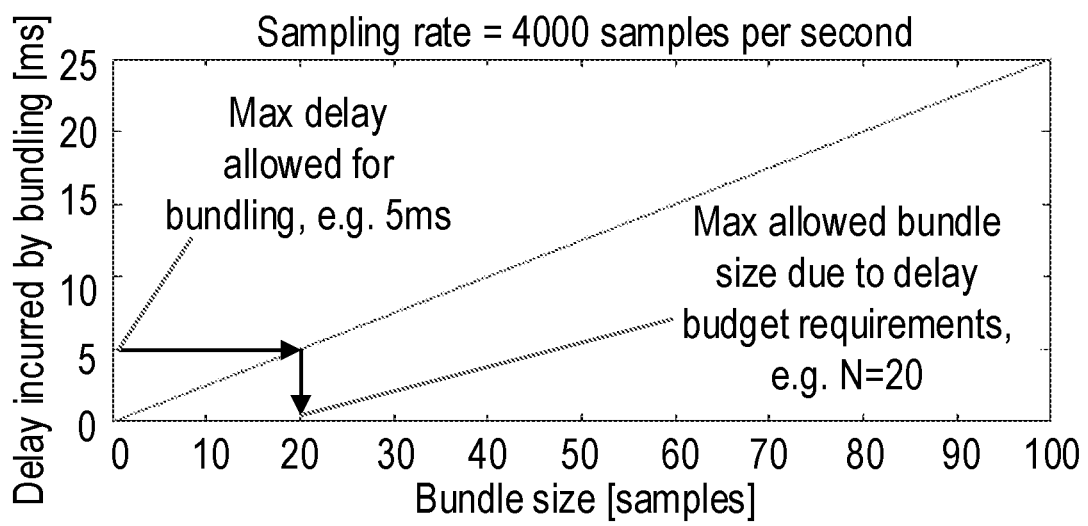
FIG. 8 illustrates the maximum allowed bundle size, N, as a function of a delay requirement imposed on a bundle delay by a total delay budget.

For example, FIG. 8 illustrates the maximum allowed bundle size, N, as a function of the delay requirement imposed on the bundle delay by the total delay budget. In this example the delay budget allows for 5 ms which for 4000 samples per seconds imply a maximum size of 20 samples per packet.

As previously mentioned, in some embodiments, the value of N is fixed on set up of the first and second wireless device. However, in some embodiments, the value of N may be determined dynamically. For example, the first wireless device may be configured to receive an indication of the maximum delay $d_{bundling}$ (which may be specific for a particular data stream or application), receive an indication of the sampling rate r of the at least one data stream, and may then calculate the value of N as described above. The first wireless device may then transmit an indication of the value of N to the second wireless device.

There is therefore provided a first wireless device configured to receive or determine a number of samples N to be bundled into a packet, receive the at least one data stream comprising a plurality of samples, bundle the samples into packets in comprising N samples, and transmit the data packets to a second wireless device.

Figure 9:
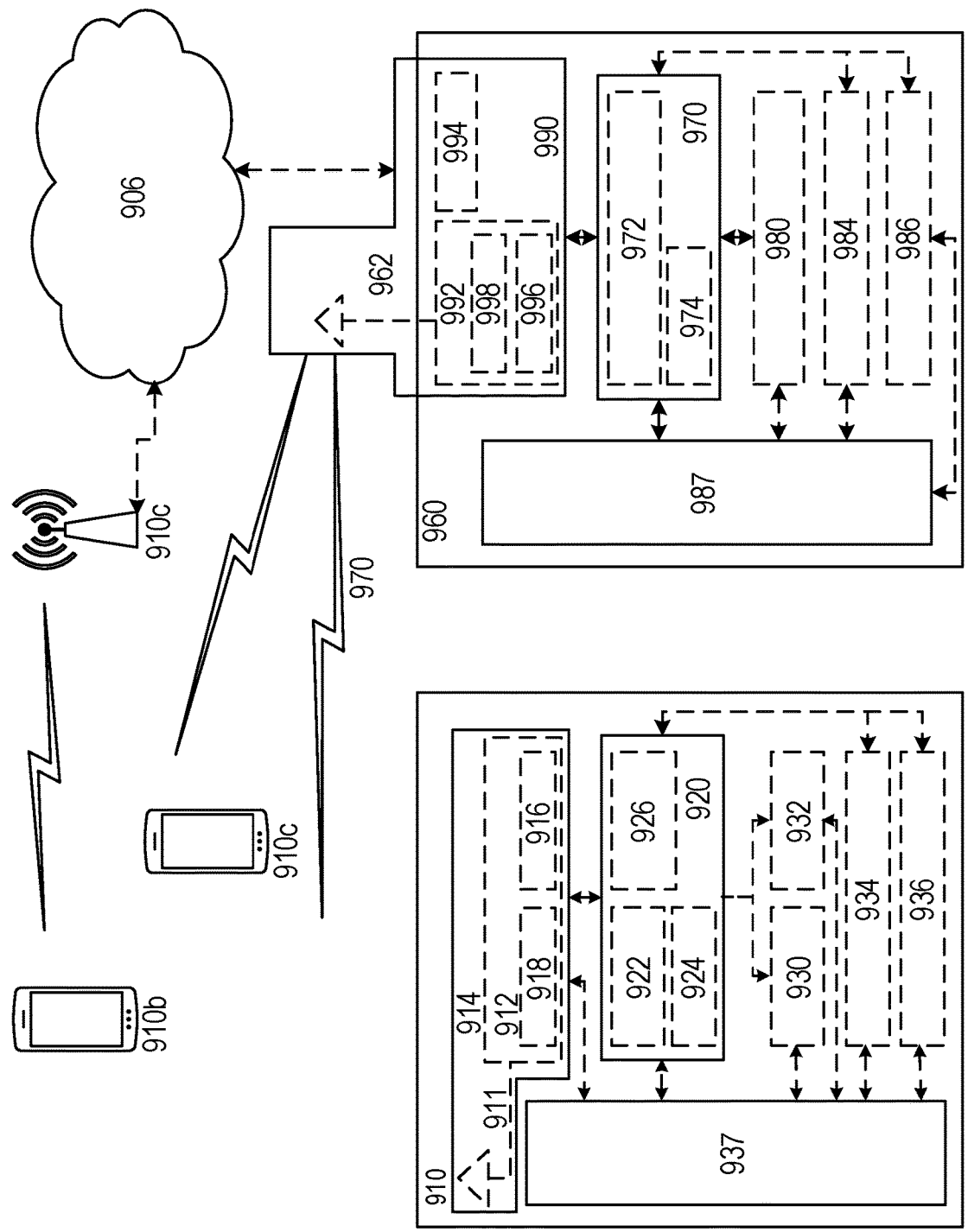
FIG. 9 illustrates a wireless network according to some embodiments.

There is therefore also provided a second wireless device configured to unbundling data packets received from the first wireless device to generate at least one data stream comprising a plurality of samples, where the at least one data stream is the same as the at least one data stream received at the first wireless device. FIG. 9 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts network 906, network nodes 960 and 960b, and WDs 910, 910b, and 910c. In practice, a wireless network may further include any additional elements suitable to support communication between wireless devices or between a wireless device and another communication device, such as a landline telephone, a service provider, or any other network node or end device. Of the illustrated components, network node 960 and wireless device (WD) 910 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 906 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 960 and WD 910 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 960 includes processing circuitry 970, device readable medium 980, interface 990, auxiliary equipment 984, power source 986, power circuitry 987, and antenna 962. Although network node 960 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 960 are depicted as single boxes located within a larger box, or nested within multiple boxes, in practice, a network node may comprise multiple different physical components that make up a single illustrated component (e.g., device readable medium 980 may comprise multiple separate hard drives as well as multiple RAM modules).

Similarly, network node 960 may be composed of multiple physically separate components (e.g., a NodeB component and a RNC component, or a BTS component and a BSC component, etc.), which may each have their own respective components. In certain scenarios in which network node 960 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 960 may be configured to support multiple radio access technologies (RATs). In such embodiments, some components may be duplicated (e.g., separate device readable medium 980 for the different RATs) and some components may be reused (e.g., the same antenna 962 may be shared by the RATs). Network node 960 may also include multiple sets of the various illustrated components for different wireless technologies integrated into network node 960, such as, for example, GSM, WCDMA, LTE, NR, WiFi, or Bluetooth wireless technologies. These wireless technologies may be integrated into the same or different chip or set of chips and other components within network node 960.

Processing circuitry 970 is configured to perform any determining, calculating, or similar operations (e.g., certain obtaining operations) described herein as being provided by a network node. These operations performed by processing circuitry 970 may include processing information obtained by processing circuitry 970 by, for example, converting the obtained information into other information, comparing the obtained information or converted information to information stored in the network node, and/or performing one or more operations based on the obtained information or converted information, and as a result of said processing making a determination.

Processing circuitry 970 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 960 components, such as device readable medium 980, network node 960 functionality. For example, processing circuitry 970 may execute instructions stored in device readable medium 980 or in memory within processing circuitry 970. Such functionality may include providing any of the various wireless features, functions, or benefits discussed herein. In some embodiments, processing circuitry 970 may include a system on a chip (SOC).

In some embodiments, processing circuitry 970 may include one or more of radio frequency (RF) transceiver circuitry 972 and baseband processing circuitry 974. In some embodiments, radio frequency (RF) transceiver circuitry 972 and baseband processing circuitry 974 may be on separate chips (or sets of chips), boards, or units, such as radio units and digital units. In alternative embodiments, part or all of RF transceiver circuitry 972 and baseband processing circuitry 974 may be on the same chip or set of chips, boards, or units In certain embodiments, some or all of the functionality described herein as being provided by a network node, base station, eNB or other such network device may be performed by processing circuitry 970 executing instructions stored on device readable medium 980 or memory within processing circuitry 970. In alternative embodiments, some or all of the functionality may be provided by processing circuitry 970 without executing instructions stored on a separate or discrete device readable medium, such as in a hard-wired manner. In any of those embodiments, whether executing instructions stored on a device readable storage medium or not, processing circuitry 970 can be configured to perform the described functionality. The benefits provided by such functionality are not limited to processing circuitry 970 alone or to other components of network node 960, but are enjoyed by network node 960 as a whole, and/or by end users and the wireless network generally.

Device readable medium 980 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 970. Device readable medium 980 may store any suitable instructions, data or information, including a computer program, software, an application including one or more of logic, rules, code, tables, etc. and/or other instructions capable of being executed by processing circuitry 970 and, utilized by network node 960. Device readable medium 980 may be used to store any calculations made by processing circuitry 970 and/or any data received via interface 990. In some embodiments, processing circuitry 970 and device readable medium 980 may be considered to be integrated.

Interface 990 is used in the wired or wireless communication of signalling and/or data between network node 960, network 906, and/or WDs 910. As illustrated, interface 990 comprises port(s)/terminal(s) 994 to send and receive data, for example to and from network 906 over a wired connection. Interface 990 also includes radio front end circuitry 992 that may be coupled to, or in certain embodiments a part of, antenna 962. Radio front end circuitry 992 comprises filters 998 and amplifiers 996. Radio front end circuitry 992 may be connected to antenna 962 and processing circuitry 970. Radio front end circuitry may be configured to condition signals communicated between antenna 962 and processing circuitry 970. Radio front end circuitry 992 may receive digital data that is to be sent out to other network nodes or WDs via a wireless connection. Radio front end circuitry 992 may convert the digital data into a radio signal having the appropriate channel and bandwidth parameters using a combination of filters 998 and/or amplifiers 996. The radio signal may then be transmitted via antenna 962. Similarly, when receiving data, antenna 962 may collect radio signals which are then converted into digital data by radio front end circuitry 992. The digital data may be passed to processing circuitry 970. In other embodiments, the interface may comprise different components and/or different combinations of components.

In certain alternative embodiments, network node 960 may not include separate radio front end circuitry 992, instead, processing circuitry 970 may comprise radio front end circuitry and may be connected to antenna 962 without separate radio front end circuitry 992. Similarly, in some embodiments, all or some of RF transceiver circuitry 972 may be considered a part of interface 990. In still other embodiments, interface 990 may include one or more ports or terminals 994, radio front end circuitry 992, and RF transceiver circuitry 972, as part of a radio unit (not shown), and interface 990 may communicate with baseband processing circuitry 974, which is part of a digital unit (not shown).

Antenna 962 may include one or more antennas, or antenna arrays, configured to send and/or receive wireless signals. Antenna 962 may be coupled to radio front end circuitry 990 and may be any type of antenna capable of transmitting and receiving data and/or signals wirelessly. In some embodiments, antenna 962 may comprise one or more omni-directional, sector or panel antennas operable to transmit/receive radio signals between, for example, 2 GHZ and 66 GHZ. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 962 may be separate from network node 960 and may be connectable to network node 960 through an interface or port.

Antenna 962, interface 990, and/or processing circuitry 970 may be configured to perform any receiving operations and/or certain obtaining operations described herein as being performed by a network node. Any information, data and/or signals may be received from a wireless device, another network node and/or any other network equipment. Similarly, antenna 962, interface 990, and/or processing circuitry 970 may be configured to perform any transmitting operations described herein as being performed by a network node. Any information, data and/or signals may be transmitted to a wireless device, another network node and/or any other network equipment.

Power circuitry 987 may comprise, or be coupled to, power management circuitry and is configured to supply the components of network node 960 with power for performing the functionality described herein. Power circuitry 987 may receive power from power source 986. Power source 986 and/or power circuitry 987 may be configured to provide power to the various components of network node 960 in a form suitable for the respective components (e.g., at a voltage and current level needed for each respective component). Power source 986 may either be included in, or external to, power circuitry 987 and/or network node 960. For example, network node 960 may be connectable to an external power source (e.g., an electricity outlet) via an input circuitry or interface such as an electrical cable, whereby the external power source supplies power to power circuitry 987. As a further example, power source 986 may comprise a source of power in the form of a battery or battery pack which is connected to, or integrated in, power circuitry 987. The battery may provide backup power should the external power source fail. Other types of power sources, such as photovoltaic devices, may also be used.

Alternative embodiments of network node 960 may include additional components beyond those shown in FIG. 9 that may be responsible for providing certain aspects of the network node's functionality, including any of the functionality described herein and/or any functionality necessary to support the subject matter described herein. For example, network node 960 may include user interface equipment to allow input of information into network node 960 and to allow output of information from network node 960. This may allow a user to perform diagnostic, maintenance, repair, and other administrative functions for network node 960.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc., A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 910 includes antenna 911, interface 914, processing circuitry 920, device readable medium 930, user interface equipment 932, auxiliary equipment 934, power source 936 and power circuitry 937. WD 910 may include multiple sets of one or more of the illustrated components for different wireless technologies supported by WD 910, such as, for example, GSM, WCDMA, LTE, NR, WiFi, WiMAX, or Bluetooth wireless technologies, just to mention a few. These wireless technologies may be integrated into the same or different chips or set of chips as other components within WD 910.

Antenna 911 may include one or more antennas or antenna arrays, configured to send and/or receive wireless signals, and is connected to interface 914. In certain alternative embodiments, antenna 911 may be separate from WD 910 and be connectable to WD 910 through an interface or port. Antenna 911, interface 914, and/or processing circuitry 920 may be configured to perform any receiving or transmitting operations described herein as being performed by a WD. Any information, data and/or signals may be received from a network node and/or another WD. In some embodiments, radio front end circuitry and/or antenna 911 may be considered an interface.

As illustrated, interface 914 comprises radio front end circuitry 912 and antenna 911. Radio front end circuitry 912 comprise one or more filters 918 and amplifiers 916. Radio front end circuitry 914 is connected to antenna 911 and processing circuitry 920, and is configured to condition signals communicated between antenna 911 and processing circuitry 920. Radio front end circuitry 912 may be coupled to or a part of antenna 911. In some embodiments, WD 910 may not include separate radio front end circuitry 912; rather, processing circuitry 920 may comprise radio front end circuitry and may be connected to antenna 911. Similarly, in some embodiments, some or all of RF transceiver circuitry 922 may be considered a part of interface 914. Radio front end circuitry 912 may receive digital data that is to be sent out to other network nodes or WDs via a wireless connection. Radio front end circuitry 912 may convert the digital data into a radio signal having the appropriate channel and bandwidth parameters using a combination of filters 918 and/or amplifiers 916. The radio signal may then be transmitted via antenna 911. Similarly, when receiving data, antenna 911 may collect radio signals which are then converted into digital data by radio front end circuitry 912. The digital data may be passed to processing circuitry 920. In other embodiments, the interface may comprise different components and/or different combinations of components.

Processing circuitry 920 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 910 components, such as device readable medium 930, WD 910 functionality. Such functionality may include providing any of the various wireless features or benefits discussed herein. For example, processing circuitry 920 may execute instructions stored in device readable medium 930 or in memory within processing circuitry 920 to provide the functionality disclosed herein.

As illustrated, processing circuitry 920 includes one or more of RF transceiver circuitry 922, baseband processing circuitry 924, and application processing circuitry 926. In other embodiments, the processing circuitry may comprise different components and/or different combinations of components. In certain embodiments processing circuitry 920 of WD 910 may comprise a SOC. In some embodiments, RF transceiver circuitry 922, baseband processing circuitry 924, and application processing circuitry 926 may be on separate chips or sets of chips. In alternative embodiments, part or all of baseband processing circuitry 924 and application processing circuitry 926 may be combined into one chip or set of chips, and RF transceiver circuitry 922 may be on a separate chip or set of chips. In still alternative embodiments, part or all of RF transceiver circuitry 922 and baseband processing circuitry 924 may be on the same chip or set of chips, and application processing circuitry 926 may be on a separate chip or set of chips. In yet other alternative embodiments, part or all of RF transceiver circuitry 922, baseband processing circuitry 924, and application processing circuitry 926 may be combined in the same chip or set of chips. In some embodiments, RF transceiver circuitry 922 may be a part of interface 914. RF transceiver circuitry 922 may condition RF signals for processing circuitry 920.

In certain embodiments, some or all of the functionality described herein as being performed by a WD may be provided by processing circuitry 920 executing instructions stored on device readable medium 930, which in certain embodiments may be a computer-readable storage medium. In alternative embodiments, some or all of the functionality may be provided by processing circuitry 920 without executing instructions stored on a separate or discrete device readable storage medium, such as in a hard-wired manner. In any of those particular embodiments, whether executing instructions stored on a device readable storage medium or not, processing circuitry 920 can be configured to perform the described functionality. The benefits provided by such functionality are not limited to processing circuitry 920 alone or to other components of WD 910, but are enjoyed by WD 910 as a whole, and/or by end users and the wireless network generally.

Processing circuitry 920 may be configured to perform any determining, calculating, or similar operations (e.g., certain obtaining operations) described herein as being performed by a WD. These operations, as performed by processing circuitry 920, may include processing information obtained by processing circuitry 920 by, for example, converting the obtained information into other information, comparing the obtained information or converted information to information stored by WD 910, and/or performing one or more operations based on the obtained information or converted information, and as a result of said processing making a determination.

Device readable medium 930 may be operable to store a computer program, software, an application including one or more of logic, rules, code, tables, etc. and/or other instructions capable of being executed by processing circuitry 920. Device readable medium 930 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 920. In some embodiments, processing circuitry 920 and device readable medium 930 may be considered to be integrated.

User interface equipment 932 may provide components that allow for a human user to interact with WD 910. Such interaction may be of many forms, such as visual, audial, tactile, etc. User interface equipment 932 may be operable to produce output to the user and to allow the user to provide input to WD 910. The type of interaction may vary depending on the type of user interface equipment 932 installed in WD 910. For example, if WD 910 is a smart phone, the interaction may be via a touch screen; if WD 910 is a smart meter, the interaction may be through a screen that provides usage (e.g., the number of gallons used) or a speaker that provides an audible alert (e.g., if smoke is detected). User interface equipment 932 may include input interfaces, devices and circuits, and output interfaces, devices and circuits. User interface equipment 932 is configured to allow input of information into WD 910, and is connected to processing circuitry 920 to allow processing circuitry 920 to process the input information. User interface equipment 932 may include, for example, a microphone, a proximity or other sensor, keys/buttons, a touch display, one or more cameras, a USB port, or other input circuitry. User interface equipment 932 is also configured to allow output of information from WD 910, and to allow processing circuitry 920 to output information from WD 910. User interface equipment 932 may include, for example, a speaker, a display, vibrating circuitry, a USB port, a headphone interface, or other output circuitry. Using one or more input and output interfaces, devices, and circuits, of user interface equipment 932, WD 910 may communicate with end users and/or the wireless network, and allow them to benefit from the functionality described herein.

Auxiliary equipment 934 is operable to provide more specific functionality which may not be generally performed by WDs. This may comprise specialized sensors for doing measurements for various purposes, interfaces for additional types of communication such as wired communications etc. The inclusion and type of components of auxiliary equipment 934 may vary depending on the embodiment and/or scenario.

Power source 936 may, in some embodiments, be in the form of a battery or battery pack. Other types of power sources, such as an external power source (e.g., an electricity outlet), photovoltaic devices or power cells, may also be used. WD 910 may further comprise power circuitry 937 for delivering power from power source 936 to the various parts of WD 910 which need power from power source 936 to carry out any functionality described or indicated herein. Power circuitry 937 may in certain embodiments comprise power management circuitry. Power circuitry 937 may additionally or alternatively be operable to receive power from an external power source; in which case WD 910 may be connectable to the external power source (such as an electricity outlet) via input circuitry or an interface such as an electrical power cable. Power circuitry 937 may also in certain embodiments be operable to deliver power from an external power source to power source 936. This may be, for example, for the charging of power source 936. Power circuitry 937 may perform any formatting, converting, or other modification to the power from power source 936 to make the power suitable for the respective components of WD 910 to which power is supplied.

Figure 10:
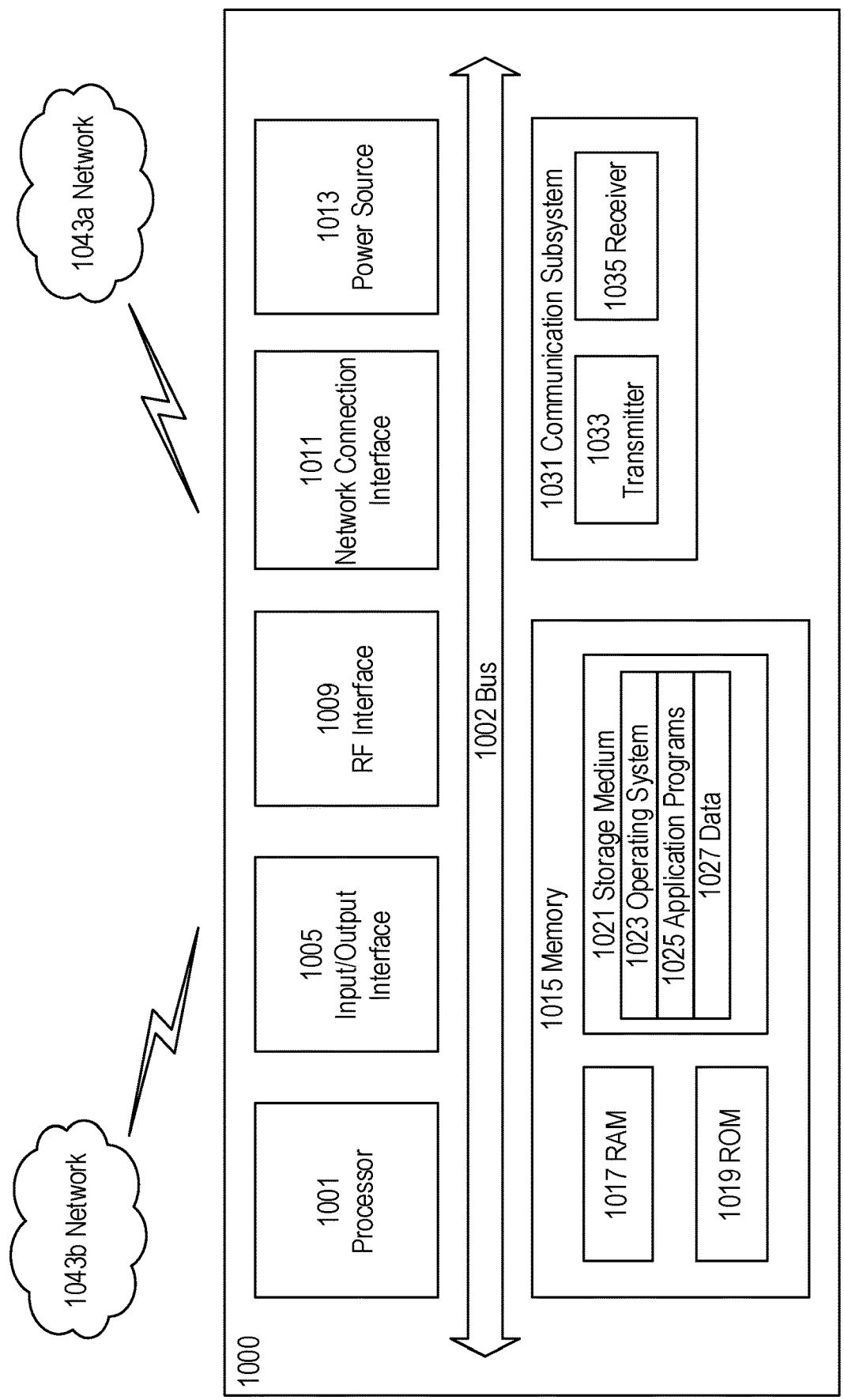
FIG. 10 illustrates a user equipment according to some embodiments.

FIG. 10 illustrates a User Equipment in accordance with some embodiments.

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1000 may be any UE identified by the 3rd Generation Partnership Project (3GPP), including a NB-IoT UE, a machine type communication (MTC) UE, and/or an enhanced MTC (eMTC) UE. UE 1000 may comprise the first wireless device or second wireless device as described with reference to any of FIGS. 1 to 8. UE 1000, as illustrated in FIG. 10, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, UE 1000 includes processing circuitry 1001 that is operatively coupled to input/output interface 1005, radio frequency (RF) interface 1009, network connection interface 1011, memory 1015 including random access memory (RAM) 1017, read-only memory (ROM) 1019, and storage medium 1021 or the like, communication subsystem 1031, power source 1033, and/or any other component, or any combination thereof. Storage medium 1021 includes operating system 1023, application program 1025, and data 1027. In other embodiments, storage medium 1021 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 1001 may be configured to process computer instructions and data. Processing circuitry 1001 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1001 may include two central processing units (CPUs). Data may be information in a form suitable for use by a computer.

In the depicted embodiment, input/output interface 1005 may be configured to provide a communication interface to an input device, output device, or input and output device. UE 1000 may be configured to use an output device via input/output interface 1005. An output device may use the same type of interface port as an input device. For example, a USB port may be used to provide input to and output from UE 1000. The output device may be a speaker, a sound card, a video card, a display, a monitor, a printer, an actuator, an emitter, a smartcard, another output device, or any combination thereof. UE 1000 may be configured to use an input device via input/output interface 1005 to allow a user to capture information into UE 1000. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 1009 may be configured to provide a communication interface to RF components such as a transmitter, a receiver, and an antenna. Network connection interface 1011 may be configured to provide a communication interface to network 1043a. Network 1043a may encompass wired and/or wireless networks such as a local-area network (LAN), a wide-area network (WAN), a computer network, a wireless network, a telecommunications network, another like network or any combination thereof. For example, network 1043a may comprise a Wi-Fi network. Network connection interface 1011 may be configured to include a receiver and a transmitter interface used to communicate with one or more other devices over a communication network according to one or more communication protocols, such as Ethernet, TCP/IP, SONET, ATM, or the like. Network connection interface 1011 may implement receiver and transmitter functionality appropriate to the communication network links (e.g., optical, electrical, and the like). The transmitter and receiver functions may share circuit components, software or firmware, or alternatively may be implemented separately.

RAM 1017 may be configured to interface via bus 1002 to processing circuitry 1001 to provide storage or caching of data or computer instructions during the execution of software programs such as the operating system, application programs, and device drivers. ROM 1019 may be configured to provide computer instructions or data to processing circuitry 1001. For example, ROM 1019 may be configured to store invariant low-level system code or data for basic system functions such as basic input and output (I/O), startup, or reception of keystrokes from a keyboard that are stored in a non-volatile memory. Storage medium 1021 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1021 may be configured to include operating system 1023, application program 1025 such as a web browser application, a widget or gadget engine or another application, and data file 1027. Storage medium 1021 may store, for use by UE 1000, any of a variety of various operating systems or combinations of operating systems.

Storage medium 1021 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1021 may allow UE 1000 to access computer-executable instructions, application programs or the like, stored on transitory or non-transitory memory media, to off-load data, or to upload data. An article of manufacture, such as one utilizing a communication system may be tangibly embodied in storage medium 1021, which may comprise a device readable medium.

In FIG. 10, processing circuitry 1001 may be configured to communicate with network 1043*b* using communication subsystem 1031. Network 1043*a* and network 1043*b* may be the same network or networks or different network or networks. Communication subsystem 1031 may be configured to include one or more transceivers used to communicate with network 1043*b*. For example, communication subsystem 1031 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1033 and/or receiver 1035 to implement transmitter or receiver functionality, respectively, appropriate to the RAN links (e.g., frequency allocations and the like). Further, transmitter 1033 and receiver 1035 of each transceiver may share circuit components, software or firmware, or alternatively may be implemented separately.

In the illustrated embodiment, the communication functions of communication subsystem 1031 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1031 may include cellular communication, Wi-Fi communication, Bluetooth communication, and GPS communication. Network 1043*b* may encompass wired and/or wireless networks such as a local-area network (LAN), a wide-area network (WAN), a computer network, a wireless network, a telecommunications network, another like network or any combination thereof. For example, network 1043*b* may be a cellular network, a Wi-Fi network, and/or a near-field network. Power source 1013 may be configured to provide alternating current (AC) or direct current (DC) power to components of UE 1000.

The features, benefits and/or functions described herein may be implemented in one of the components of UE 1000 or partitioned across multiple components of UE 1000. Further, the features, benefits, and/or functions described herein may be implemented in any combination of hardware, software or firmware. In one example, communication subsystem 1031 may be configured to include any of the components described herein. Further, processing circuitry 1001 may be configured to communicate with any of such components over bus 1002. In another example, any of such components may be represented by program instructions stored in memory that when executed by processing circuitry 1001 perform the corresponding functions described herein. In another example, the functionality of any of such components may be partitioned between processing circuitry 1001 and communication subsystem 1031. In another example, the non-computationally intensive functions of any of such components may be implemented in software or firmware and the computationally intensive functions may be implemented in hardware.

Figure 11:
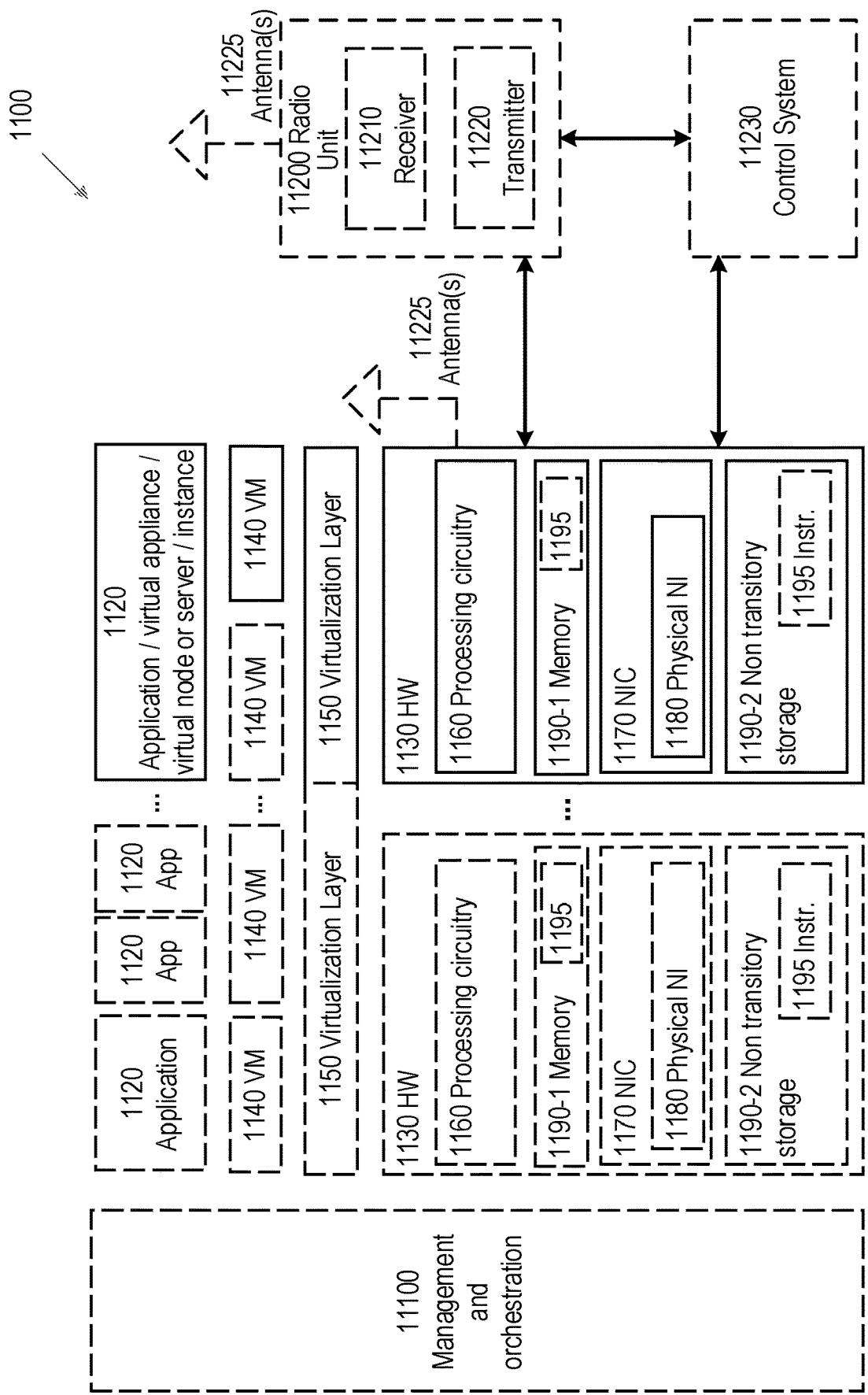
FIG. 11 illustrates a virtualization environment according to some embodiments.

FIG. 11 illustrates a Virtualization environment in accordance with some embodiments.

FIG. 11 is a schematic block diagram illustrating a virtualization environment 1100 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1100 hosted by one or more of hardware nodes 1130. Further, in embodiments in which the virtual node is not a radio access node or does not require radio connectivity (e.g., a core network node), then the network node may be entirely virtualized.

The functions may be implemented by one or more applications 1120 (which may alternatively be called software instances, virtual appliances, network functions, virtual nodes, virtual network functions, etc.) operative to implement some of the features, functions, and/or benefits of some of the embodiments disclosed herein. Applications 1120 are run in virtualization environment 1100 which provides hardware 1130 comprising processing circuitry 1160 and memory 1190. Memory 1190 contains instructions 1195 executable by processing circuitry 1160 whereby application 1120 is operative to provide one or more of the features, benefits, and/or functions disclosed herein.

Virtualization environment 1100, comprises general-purpose or special-purpose network hardware devices 1130 comprising a set of one or more processors or processing circuitry 1160, which may be commercial off-the-shelf (COTS) processors, dedicated Application Specific Integrated Circuits (ASICs), or any other type of processing circuitry including digital or analog hardware components or special purpose processors. Each hardware device may comprise memory 1190-1 which may be non-persistent memory for temporarily storing instructions 1195 or software executed by processing circuitry 1160. Each hardware device may comprise one or more network interface controllers (NICs) 1170, also known as network interface cards, which include physical network interface 1180. Each hardware device may also include non-transitory, persistent, machine-readable storage media 1190-2 having stored therein software 1195 and/or instructions executable by processing circuitry 1160. Software 1195 may include any type of software including software for instantiating one or more virtualization layers 1150 (also referred to as hypervisors), software to execute virtual machines 1140 as well as software allowing it to execute functions, features and/or benefits described in relation with some embodiments described herein.

Virtual machines 1140, comprise virtual processing, virtual memory, virtual networking or interface and virtual storage, and may be run by a corresponding virtualization layer 1150 or hypervisor. Different embodiments of the instance of virtual appliance 1120 may be implemented on one or more of virtual machines 1140, and the implementations may be made in different ways.

During operation, processing circuitry 1160 executes software 1195 to instantiate the hypervisor or virtualization layer 1150, which may sometimes be referred to as a virtual machine monitor (VMM). Virtualization layer 1150 may present a virtual operating platform that appears like networking hardware to virtual machine 1140.

As shown in FIG. 11, hardware 1130 may be a standalone network node with generic or specific components. Hardware 1130 may comprise antenna 11225 and may implement some functions via virtualization. Alternatively, hardware 1130 may be part of a larger cluster of hardware (e.g. such as in a data center or customer premise equipment (CPE)) where many hardware nodes work together and are managed via management and orchestration (MANO) 11100, which, among others, oversees lifecycle management of applications 1120.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1140 may be a software implementation of a physical machine that runs programs as if they were executing on a physical, non-virtualized machine. Each of virtual machines 1140, and that part of hardware 1130 that executes that virtual machine, be it hardware dedicated to that virtual machine and/or hardware shared by that virtual machine with others of the virtual machines 1140, forms a separate virtual network elements (VNE).

Still in the context of NFV, Virtual Network Function (VNF) is responsible for handling specific network functions that run in one or more virtual machines 1140 on top of hardware networking infrastructure 1130 and corresponds to application 1120 in FIG. 11.

In some embodiments, one or more radio units 11200 that each include one or more transmitters 11220 and one or more receivers 11210 may be coupled to one or more antennas 11225. Radio units 11200 may communicate directly with hardware nodes 1130 via one or more appropriate network interfaces and may be used in combination with the virtual components to provide a virtual node with radio capabilities, such as a radio access node or a base station.

In some embodiments, some signalling can be effected with the use of control system 11230 which may alternatively be used for communication between the hardware nodes 1130 and radio units 11200.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 12:
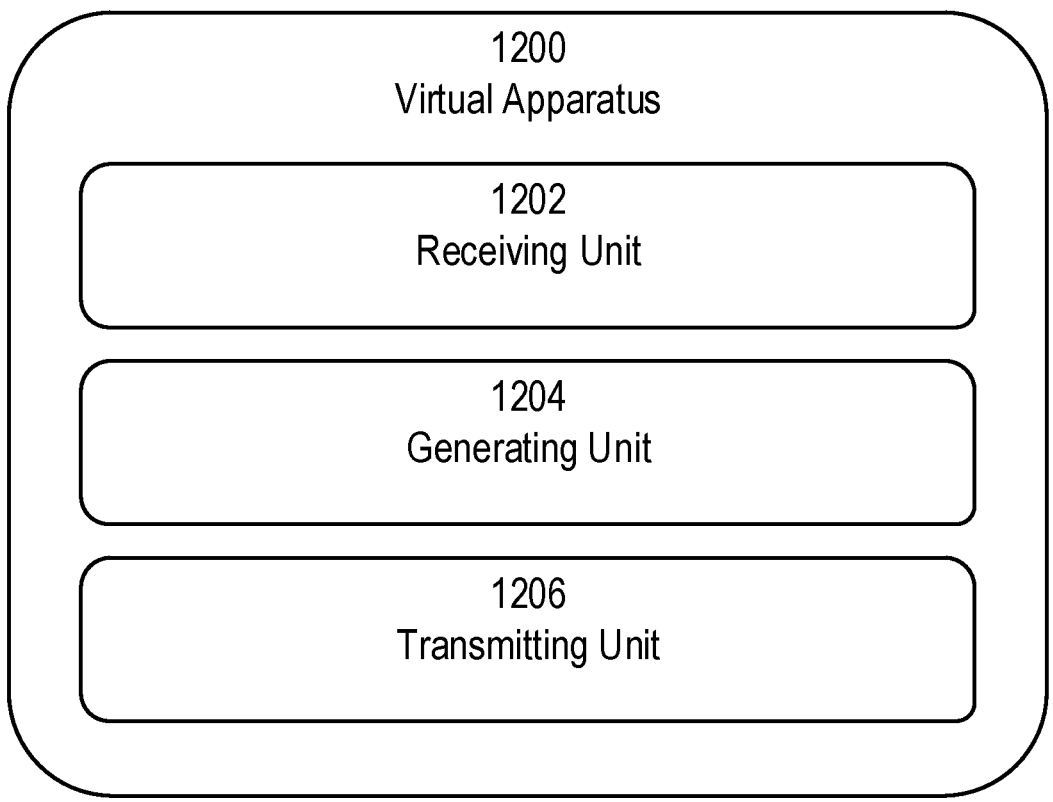
FIGS. 12-13 illustrates two virtualization apparatus according to some embodiments.

FIG. 12 illustrates a virtualization apparatus in accordance with some embodiments FIG. 12 illustrates a schematic block diagram of an apparatus 1200 in a wireless network (for example, the wireless network shown in FIG. 9). The apparatus may be implemented in a wireless device (e.g., wireless device 910 or network node 960 shown in FIG. 9, or first wireless device (SPTD) in FIG. 1). Apparatus 1200 is operable to carry out the example method described with reference to FIG. 2 and possibly any other processes or methods disclosed herein. It is also to be understood that the method of FIG. 2 is not necessarily carried out solely by apparatus 1200. At least some operations of the method can be performed by one or more other entities.

Virtual Apparatus 1200 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause Receiving unit 1202, Generating unit 1204, and Transmitting Unit 1206, and any other suitable units of apparatus 1200 to perform corresponding functions according one or more embodiments of the present disclosure.

As illustrated in FIG. 12, apparatus 1200 includes Receiving unit 1202, Generating unit 1204, and Transmitting Unit 1206, Receiving unit 1202 is configured to receive the at least one data stream; Generating Unit 1204 is configured to generate a first data packet comprising N of the plurality of samples, wherein N is an integer value of greater than or equal to 2; and Transmitting Unit 1206 is configured to transmit the first data packet to the second wireless device.

Figure 13:
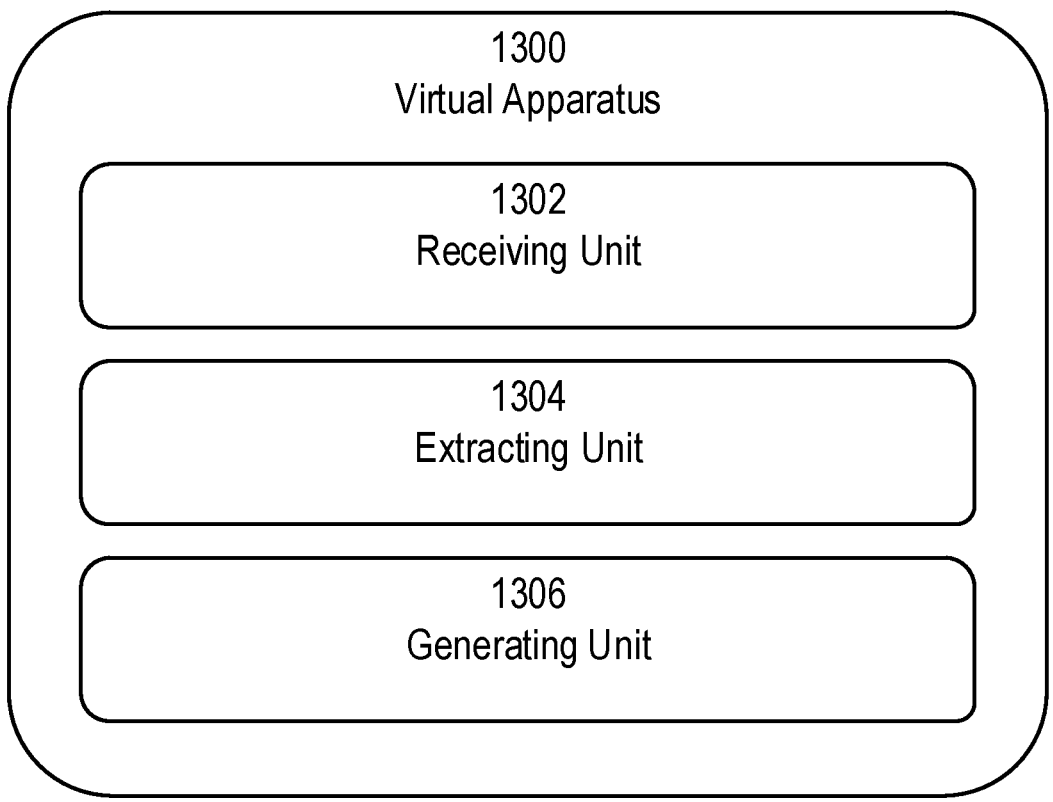

FIG. 13 illustrates a Virtualization apparatus in accordance with some embodiments.

FIG. 13 illustrates a schematic block diagram of an apparatus 1300 in a wireless network (for example, the wireless network shown in FIG. 9). The apparatus may be implemented in a wireless device (e.g., wireless device 910 or network node 960 shown in FIG. 9, or second wireless device (SURD) in FIG. 1). Apparatus 1300 is operable to carry out the example method described with reference to FIG. 3 and possibly any other processes or methods disclosed herein. It is also to be understood that the method of FIG. 3 is not necessarily carried out solely by apparatus 1300. At least some operations of the method can be performed by one or more other entities.

Virtual Apparatus 1300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause Receiving unit 1302, Extracting unit 1304, and Generating Unit 1306, and any other suitable units of apparatus 1300 to perform corresponding functions according one or more embodiments of the present disclosure.

As illustrated in FIG. 13, apparatus 1300 includes Receiving unit 1302, Extracting unit 1304, and Generating Unit 1306, Receiving unit 1302 is configured to receive at least a first data packet; Extracting Unit 1304 is configured to extract a N of samples from the first data packet, wherein N is an integer value of greater than or equal to 2; and Generating Unit 1306 is configured to generate the at least one data stream based on the extracted N samples.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

EMBODIMENTS

Group A Embodiments

1. A method performed by a first wireless device for transmitting at least one data stream comprising a plurality of samples to a second wireless device using machine-to-machine communication, the method comprising:
   receiving the at least one data stream;
   generating a first data packet comprising N of the plurality of samples, wherein N is an integer value of greater than or equal to 2; and
   transmitting the first data packet to the second wireless device.

2. The method as in embodiment 1 wherein the step of generating comprises bundling the N samples into the first data packet according to a predetermined pattern.

3. The method as in embodiment 2 further comprising transmitting an indication of the predetermined pattern to the second wireless device.

4. The method of embodiment 2 or 3 wherein the predetermined pattern comprises bundling samples of the at least one data stream identified by a sampling ID, sID, wherein sID=k+stepover*m,
   a. wherein stepover is an integer value of greater than or equal to 2, k is an sID of a first sample to be bundled into the first data packet, and m=0:N−1.

5. The method of embodiment 1 further comprising, buffering N samples of the received at least one data stream before generating the packet.

6. The method of embodiment 4 further comprising:
   buffering k+steopover*m samples of the received at least one data stream before generating the packet.

7. The method of embodiment 4 or 6 further comprising:
   transmitting an indication of the value of k to the second wireless device.

8. The method of any of the previous embodiments wherein the value of N satisfies the following:

$$N \leq \left\lfloor \frac{\text{bits\_per\_packet}}{\text{bits\_per\_sample}} \right\rfloor,$$

where bits_per_packet is a number of bits per transmission time interval and bits_per_sample is a number of bits in each of the plurality of samples.

9. The method of any of the previous embodiments wherein the value of N satisfies the following:
   N≤r*$d_{bundling}$, wherein r is a sampling rate of the at least one data stream and $d_{bundling}$ is a maximum delay allowed for bundling of the at least one data stream.

10. The method of embodiment 7 further comprising:
    receiving indication of the maximum delay $d_{bundling}$,
    receiving an indication of the sampling rate r of the at least one data stream,
    calculating the value of N; and
    transmitting an indication of the value of N to the second wireless device.

11. The method of any of the previous embodiments further comprising
    transmitting the first data packet in a first transmission time interval; and transmitting a repeat of the first data packet in a second transmission time interval after the first transmission time interval.

12. The method as in any previous embodiment wherein the at least one data stream comprises two or more data streams.

13. The method of any of the previous embodiments, further comprising:
   providing user data; and
   forwarding the user data to a host computer via the transmission to the base station.

Group B Embodiments

14. A method performed by a second wireless device for receiving at least one data stream comprising a plurality of samples from a first wireless device using machine-to-machine communication, the method comprising:
   receiving at least a first data packet;
   extracting N samples from the first data packet, wherein N is an integer value of greater than or equal to 2; and
   generating the at least one data stream based on the extracted N samples.

15. The method as in embodiment 14 wherein the step of generating comprises de-bundling the N samples into the at least one first data stream according to a predetermined pattern.

16. The method as in embodiment 15 further comprising receiving an indication of the predetermined pattern from the first wireless device.

17. The method of embodiment 15 or 16 wherein the predetermined pattern comprises de-bundling samples of the at least one data stream identified by a sampling ID, sID, wherein sID=k+stepover*m,
   a, wherein stepover is an integer value of greater than or equal to 2, k is an sID of a first sample to be bundled into the first data packet, and m=0: N−1.

18. The method of embodiment 17 further comprising:
   receiving an indication of the value of k from the first wireless device.

19. The method of any of embodiments 14 to 18 wherein the value of N satisfies the following:

$$N \leq \left\lfloor \frac{\text{bits\_per\_packet}}{\text{bits\_per\_sample}} \right\rfloor,$$

where bits_per_packet is a number of bits per transmission time interval and bits_per_sample is a number of bits in each of the plurality of samples.

20. The method of any of embodiments 14 to 19 wherein the value of N satisfies the following:
   $N \leq r*d_{bundling}$, wherein r is a sampling rate of the at least one data stream and $d_{bundling}$ is a maximum delay allowed for bundling of the at least one data stream.

21. The method of any of embodiments 14 to 20 further comprising:
   receiving an indication of the value of N to the second wireless device.

22. The method of any of embodiments 14 to 21 further comprising
   receiving the first data packet in a first transmission time interval; and
   receiving a repeat of the first data packet in a second transmission time interval after the first transmission time interval.

23. The method as in any previous embodiment wherein the at least one data stream comprises two or more data streams.

24. The method of any of the previous embodiments, further comprising:
   providing user data; and
   forwarding the user data to a host computer via the transmission to the base station.

Group C Embodiments

25. A first wireless device for transmitting at least one data stream comprising a plurality of samples to a second wireless device using machine-to-machine communication, the first wireless device comprising:
   processing circuitry configured to perform any of the steps of any of the Group A embodiments; and
   power supply circuitry configured to supply power to the wireless device.

26. A second wireless device for receiving at least one data stream comprising a plurality of samples from a first wireless device using machine-to-machine communication, the second wireless device comprising:
   processing circuitry configured to perform any of the steps of any of the Group B embodiments;
   power supply circuitry configured to supply power to the base station.

27. A user equipment (UE) for transmitting at least one data stream comprising a plurality of samples to a second wireless device using machine-to-machine communication, the UE comprising:
   an antenna configured to send and receive wireless signals;
   radio front-end circuitry connected to the antenna and to processing circuitry, and configured to condition signals communicated between the antenna and the processing circuitry;
   the processing circuitry being configured to perform any of the steps of any of the Group A embodiments;
   an input interface connected to the processing circuitry and configured to allow input of information into the UE to be processed by the processing circuitry; and
   an output interface connected to the processing circuitry and configured to output information from the UE that has been processed by the processing circuitry.

28. A user equipment (UE) for receiving at least one data stream comprising a plurality of samples from a first wireless device using machine-to-machine communication, the UE comprising:
   an antenna configured to send and receive wireless signals;
   radio front-end circuitry connected to the antenna and to processing circuitry, and configured to condition signals communicated between the antenna and the processing circuitry;
   the processing circuitry being configured to perform any of the steps of any of the Group B embodiments;
   an input interface connected to the processing circuitry and configured to allow input of information into the UE to be processed by the processing circuitry;
   an output interface connected to the processing circuitry and configured to output information from the UE that has been processed by the processing circuitry.

29. A communication system including a host computer comprising:
- processing circuitry configured to provide user data; and
- a communication interface configured to forward user data to a cellular network for transmission to a user equipment (UE),
- wherein the UE comprises a radio interface and processing circuitry, the UE's components configured to perform any of the steps of any of the Group A or B embodiments.

30. The communication system of the previous embodiment, wherein:
- the processing circuitry of the host computer is configured to execute a host application, thereby providing the user data; and
- the UE's processing circuitry is configured to execute a client application associated with the host application.

Abbreviations

At least some of the following abbreviations may be used in this disclosure. If there is an inconsistency between abbreviations, preference should be given to how it is used above. If listed multiple times below, the first listing should be preferred over any subsequent listing(s).

3GPP 3$^{rd}$ Generation Partnership Project
LTE Long-Term Evolution
M2M Machine-to-Machine
QoS Quality-of-Service
RAT Radio Access Technology
SA Substation Automation
SRS Scheduling Request
SPTD Sample Packing Transmission Device
SURD Sample Unpacking Receiving Device
UCI Uplink Control Information
UL Uplink
URLLC Ultra-Reliable Low-Latency Communication
1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDUCommon Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a first wireless device for transmitting a plurality of samples to a second wireless device using machine-to-machine communication, the method comprising:
receiving a plurality of data streams, wherein the plurality of data streams comprise samples of a corresponding plurality of signals;
generating a first data packet comprising bundling at least one sample from each of the plurality of received data streams into the first data packet according to a predetermined pattern, wherein:
the predetermined pattern comprises N≥2 samples, from each received data stream, that are identified by respective sampling identifiers (sIDs) k+stepover*m,
m is a sequence of integers from 0 to N−1,
stepover is an integer value of greater than or equal to 2, and
k is an sID of a first sample to be bundled into the first data packet; and
transmitting the first data packet to the second wireless device.

2. The method of claim 1, further comprising transmitting an indication of the predetermined pattern to the second wireless device.

3. The method of claim 1, further comprising buffering (k+stepover*(N−1)) samples of each received data stream before generating the first data packet.

4. The method of claim 1, further comprising transmitting an indication of the value of k to the second wireless device.

5. The method of claim 1, further comprising buffering N≥2 samples of each received data stream before generating the first data packet.

6. The method of claim 1, wherein:
the first data packet comprises a plurality of samples, with the plurality being less than or equal to floor (bits_per_packet/bits_per_sample),
bits_per_packet is a number of bits that can be transported per transmission time interval,
bits_per_sample is a number of bits in each of the plurality of samples, and
floor (x) is the next lowest integer relative to x.

7. The method of claim 1, wherein:
the first data packet comprises a plurality of samples, with the plurality being less than or equal to $r * d_{bundling}$,
r is a sampling rate of the at least one data stream, and
$d_{bundling}$ is a maximum delay allowed for bundling of the at least one data stream.

8. A method performed by a second wireless device for receiving a plurality of samples from a first wireless device using machine-to-machine communication, the method comprising:
receiving at least a first data packet from the first wireless device;
extracting, from the first data packet, a plurality of samples associated with a plurality of signals; and
generating, based on the extracted samples, a plurality of data streams corresponding to the plurality of signals.

9. The method of claim 8, wherein generating comprises de-bundling the plurality of samples into the plurality of data streams according to a predetermined pattern.

10. The method of claim 9, further comprising receiving an indication of the predetermined pattern from the first wireless device.

11. The method of claim 8 wherein:
the predetermined pattern comprises N≥2 samples, from each data stream, that are identified by respective sampling identifiers (sIDs) k+stepover*m,
m is a sequence of integers from 0 to N−1,
stepover is an integer value of greater than or equal to 2, and
k is an sID of a first sample to be de-bundled from the first data packet.

12. A first wireless device configured to transmit a plurality of samples to a second wireless device using machine-to-machine communication, the first wireless device comprising processing circuitry configured to:
receive a plurality of data streams, wherein the plurality of data streams comprise samples of a corresponding plurality of signals;
generate a first data packet based on bundling at least one sample from each of the plurality of received data streams into the first data packet according to a predetermined pattern, wherein:
the predetermined pattern comprises N≥2 samples, from each received data stream, that are identified by respective sampling identifiers (sIDs) k+stepover*m,
m is a sequence of integers from 0 to N−1,
stepover is an integer value of greater than or equal to 2, and
k is an sID of a first sample to be bundled into the first data packet; and
transmit the first data packet to the second wireless device.

13. The first wireless device of claim 12, wherein the processing circuitry is further configured to transmit an indication of the predetermined pattern to the second wireless device.

14. A second wireless device configured to receive a plurality of samples from a first wireless device using machine-to-machine communication, the second wireless device comprising processing circuitry configured to perform operations corresponding to the method of claim 8.

15. The second wireless device of claim 14, wherein the processing circuitry is configured to generate the at least one data stream by de-bundling the plurality of samples into the plurality of data streams according to a predetermined pattern.

16. The second wireless device of claim 14, wherein the processing circuitry is further configured to receive an indication of the predetermined pattern from the first wireless device.

* * * * *